United States Patent [19]

Freeman et al.

[11] Patent Number: 4,802,212
[45] Date of Patent: Jan. 31, 1989

[54] METHOD AND DEVICE FOR PREVENTING TAPE PIRACY

[75] Inventors: Samuel R. Freeman, 3159 E. Wood Valley Rd., NW., Atlanta, Ga. 30327; Thomas G. Wright, Atlanta, Ga.

[73] Assignee: Samuel R. Freeman, Atlanta, Ga.

[21] Appl. No.: 57,017

[22] Filed: Jun. 1, 1987

[51] Int. Cl.[4] .......................... G11B 15/04; H04L 9/00
[52] U.S. Cl. ............................................ 380/3; 360/60; 380/6
[58] Field of Search ..................... 380/3, 6, 19; 360/60

[56] References Cited

U.S. PATENT DOCUMENTS

| | | | |
|---|---|---|---|
| 3,936,594 | 2/1976 | Schubin | 380/19 |
| 3,963,865 | 6/1976 | Songer | 360/37 |
| 4,100,575 | 7/1978 | Morio et al. | 360/37 |
| 4,163,253 | 7/1979 | Morio et al. | 360/37 |
| 4,603,349 | 7/1986 | Robbins | 358/86 |

Primary Examiner—Stephen C. Buczinski
Attorney, Agent, or Firm—Hurt, Richardson, Garner, Todd & Cadenhead

[57] ABSTRACT

A device is disclosed to prevent the unauthorized copying of magnetic tapes (tape "piracy"). The device utilizes an inaudible signal encoded into the tape program as the master recording is being made. A separate decoding circuit is to be installed in commercially available stereo tape decks. Whenever the encoded signal is present on the original recording, the decoding circuitry will short the bias signal of the tape deck being used to attempt to make the copies. This will prevent the deck from recording any of the program on the original tape.

10 Claims, 1 Drawing Sheet

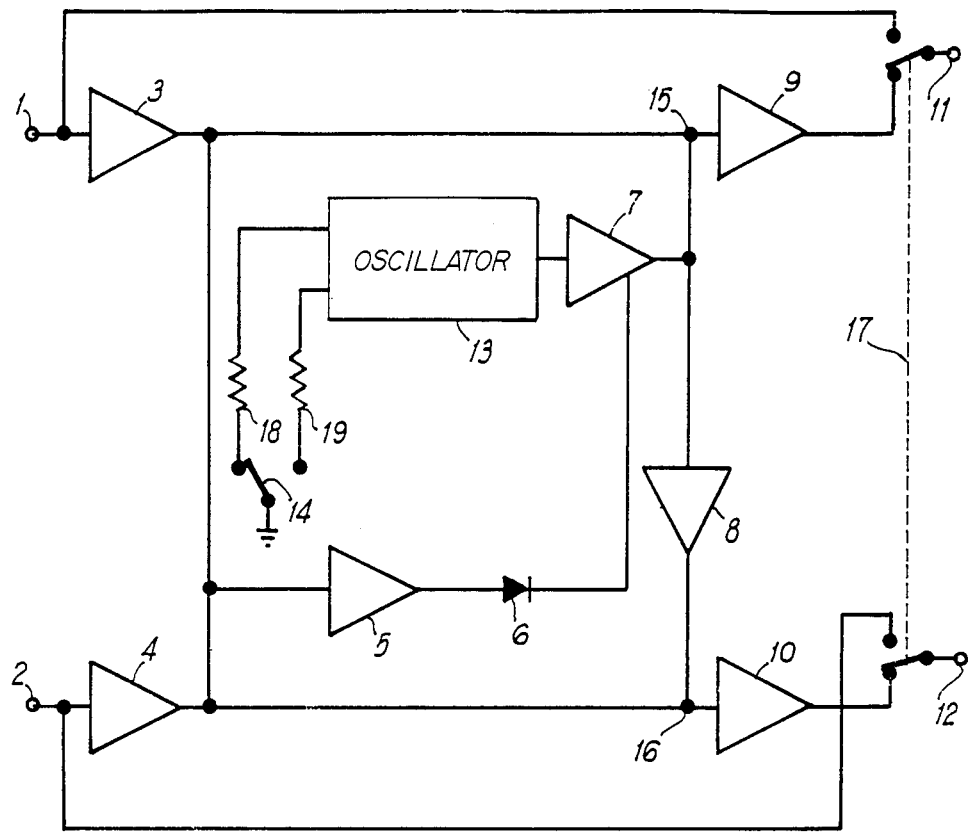
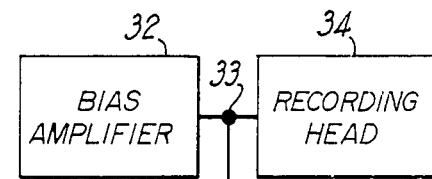
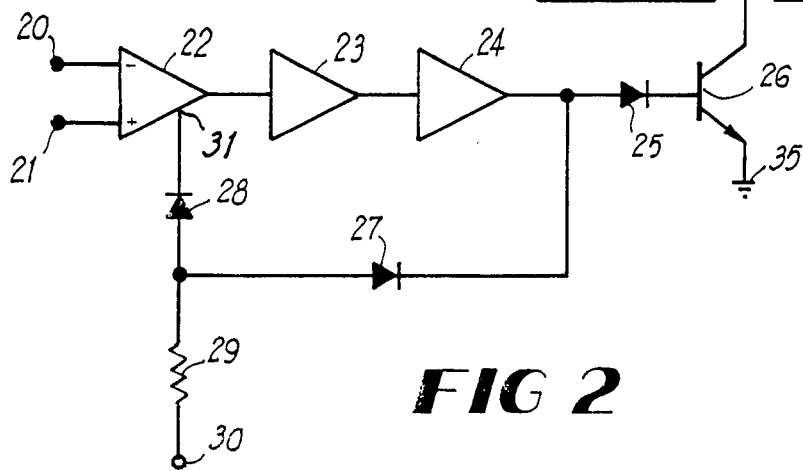
FIG 1
FIG 2

METHOD AND DEVICE FOR PREVENTING TAPE PIRACY

BACKGROUND OF THE INVENTION

1. Field of the Invention

This invention relates to the recording of program materials such as speech or music and more particularly to devices for preventing the illegal copying of these recorded materials.

Unauthorized copying of magnetic tapes, often termed 'piracy' or 'pirating', is a widespread activity. As a result of these acts, the revenues of tape publishers or their licensees have been significantly diminished. Accordingly, a need exists to equip original recordings with a means to prevent unauthorized copies from later being made.

2. Description of the Prior Art

Inventions relating to the prevention and detection of unauthorized tape duplications have already been described by British Pat. No. 1,525,292 and U.S. Pat. Nos. 4,040,099 and 4,086,634.

The first names patent refers to a technique for identifying the source from which an unauthorized recording was made. After the original recording is completed, imperceptible amounts of information are erased from the tape (or disk) in a particular pattern. If the tape is later duplicated, the pattern of gaps will be duplicated as well, thereby indicating the source of the copy.

The second named patent exploits the approximately 90° phase shift between low frequency recorded material and high frequency recorded material inescapably introduced by the duplicating hardware now in use. The invention teaches a technique for preparing the original tapes by inserting predetermined high and low frequency signals in particular narrow frequency bands and a method for comparing the phase of these signals with the phase of signals recorded on a suspected tape. Any phase shift present would be readily detected through the use of an oscilloscope.

The third named patent refers to a technique for destroying the audio quality of a duplication by introducing beat or cross-modulation interference signals. It teaches a method for recording a high frequency modulated signal together with the audible program in a manner that will produce on the copy detectable and identifiable interference signals arising between the modulated signal and conventional high frequency recording bias signal.

Heretofore, no techniques have been disclosed that prevent the recording mechanism of the copying tape deck from functioning, thereby not permitting any of the program material from being copied whatsoever.

SUMMARY OF THE INVENTION

The present device utilizes a low frequency, low level signal to control a transistor switch that shorts to ground the bias signal in a tape deck. This prevents the record head on the tape deck from functioning.

When the master recording is being made, the encoding portion of the circuitry generates a low frequency encoding tone that is held well below the level of the speech or music on the program. This inaudible tone is then mixed in with the stereo program channels but with an 180° phase shift. The mixed signals are then passed to the master recorder.

The decoding circuitry is designed to be installed into any commercially available stereo tape deck. The circuit rejects all but the low frequency 180° out of phase signals and then uses them to turn on a transistor switch. The output of the transistor feeds to the bias signal being fed to the record head. If the encoding tone is present on the original tape, the transistor will turn on and short out the bias signal of the deck attempting to be used to record the copy. If the encoding tone is not present on the original tape, the recording tape deck will function normally.

BRIEF DESCRIPTION OF THE DRAWINGS

FIG. 1 details a schematic diagram of the encoding circuitry.

FIG. 2 details a schematic diagram of the decoding circuitry.

DETAILED DESCRIPTION

The novel features characteristic of the invention are set forth with particularity in the appended claims. The invention itself, however, may best be understood by reference to the following description taken in conjunction with the accompanying drawings.

FIG. 1 shows a schematic diagram of the portion of the apparatus that encodes legitimately recorded tapes with a low frequency signal. The left and right channels of the stereo output of the studio console are fed into the circuit at junctions 1 and 2. The signals are then passed through inverting buffer amplifiers 3 and 4, respectively, with unity gain and are summed at the input of amplifier 5. The resulting signal is rectified by diode 6 and used to control the gain of amplifier 7.

Oscillator 13 provides a low frequency sinusoidal signal. Switch 14 and its associated resistance paths 18 and 19 may be used in conjunction with the oscillator 13 to allow the designer two possible encoding frequencies from which to work. The output of oscillator 13 is then fed into the operational transconductance amplifier 7 (whose gain is controlled by the level of the console signal through the aforementioned components 1–6) in order to render the low frequency tone inaudible. From amplifier 7, the signal is mixed back into the program signal channels 180° out of phase at junctions 15 and 16 with inverting amplifier 8 necessary to accomplish the inversion for the right hand channel. The mixed signals at 15 and 16 pass through amplifiers 9 and 10, respectively, to the output of the encoder at 11 and 12. Double pole-single throw switch 17 may be used to bypass the encoding circuitry. The output at 11 and 12 is then sent on to the master tape recorder.

FIG. 2 shows a schematic diagram of the decode portion of the apparatus used in order to prevent unauthorized tapes from being recorded. The stereo output channels of the deck playing the original tape are fed into the respective stereo inputs 20 and 21 of the deck being used to record onto a second magnetic tape. The signals present at inputs 20 and 21 are then passed through amplifier 22 as a differential signal, thereby yielding at the output of 22 only 180° out of phase signals. This resultant output is then passed through a band pass amplifier 23 centered at the frequency of the encoded signal. Amplifier 23 functions to remove all but the encoded signal, if present. The result then flows through amplifier 24, which along with diode 8 performs an AC to DC conversion, and arrives at the input of diode 25.

Transistor 26 operates as a switch. When the encoded signal is present, the positive DC voltage at the input of diode 25 will be great enough to allow it to conduct, thereby providing a positive voltage at the base of transistor 26. If that voltage is present, the transistor will turn on and effectively short to ground at 35 the signal present at junction 33. The bias signal from the bias amplifier 32 passes through junction 33 on its way to the record head of the deck, 34. Thus, when transistor 26 is on, there will be no bias signal present at the record head 34. If the encoded signal is not present, transistor 26 will not turn on; hence, the bias signal will pass from bias amplifier 32 to record head 34 undisturbed.

Operational transconductance amplifier 22 is biased on through resistor 29 and forward-biased diode 28 connected in series with positive voltage source 30. The input to diode 28 also is connected to the output of reverse-biased diode 27, closing a compression feedback loop from the input of amplifier 22 to its bias voltage port 31. As the signal input to amplifier 22 increases, the signal input to reverse-biased diode 27 will also increase, thereby causing the positive voltage at the input of diode 28 to be decreased and the gain of amplifier 22 to be decreased as well. As the signal input to amplifier 22 decreases, the feedback circuit will increase the gain of amplifier 22. Thus, the feedback circuit operates to provide a nearly constant voltage to diode 25 when the encoded signal is present.

We claim:

1. A method for preventing the unauthorized duplication of audible left and right channel stereo program material by magnetic tape recording on a stereo tape deck including a bias amplifier for providing a bias signal to the recording head of the tape deck, said method comprising:
    encoding an inaudible first low frequency tone on said left channel stereo program material and encoding an inaudible second low frequency tone on said right channel stereo program material, said second low frequency tone being 180° out of phase relative to said first low frequency tone;
    recording said encoded left channel and said encoded right channel stereo program material on a master recorder;
    installing a decoding circuit on said stereo tape deck;
    decoding said encoded left channel and said encoded right channel stereo program material on said stereo tape deck to recover said first low frequency tone and said second low frequency tone; and
    shunting said bias signal to ground in response to the recovery of said first low frequency tone and said second low frequency tone.

2. A method as claimed in claim 1 wherein the encoding step further comprises:
    inverting both the left and right channel stereo program material;
    summing said inverted program material;
    converting said summed program material to a direct current signal;
    generating a low frequency sinusoidal signal;
    passing said low frequency sinusoidal signal to a first operational transconductance amplifier;
    applying said direct current signal to said first operational transconductance amplifier to produce an inaudible first low frequency tone;
    mixing said first low frequency tone with the left channel stereo program material to produce encoded left channel stereo program material;
    inverting said first low frequency tone to produce a second low frequency tone that is 180° out of phase with respect to said first low frequency tone; and
    mixing said second low frequency tone with the right channel stereo program material to produce encoded right channel stereo program material.

3. A method as claimed in claim 2 wherein the decoding step further comprises:
    inputting the encoded left channel and encoded right channel stereo program material to a decode circuit in said stereo tape deck;
    summing said encoded left channel and said encoded right channel stereo program material in a second operational transconductance amplifier wherein said first low frequency tone and said second low frequency tone are differenced to produce an output signal that contains both of said low frequency tones;
    filtering said output signal so as to reject all but the low frequency tones;
    converting said filtered output signal to a direct current signal;
    controlling the gain of said second operational transconductance amplifier to maintain said direct current signal at a nearly constant voltage;
    applying said direct current signal to the base junction of a transistor switch to activate said switch; and
    shunting to ground said bias signal of said tape deck whenever said transistor switch is activated.

4. A method as claimed in claim 1 wherein the frequency of said first low frequency tone and said second low frequency tone is 42 Hz.

5. A method as claimed in claim 1 wherein the frequency of said first low frequency tone and said second low frequency tone is 21 Hz.

6. An apparatus for preventing the unauthorized duplication of audible left and right channel stereo program material by magnetic tape recording on a stereo tape deck including a bias amplifier for providing a bias signal to the recording head of the tape deck, said apparatus comprising:
    means for encoding an inaudible low frequency tone on said left channel stereo program material and for encoding an inaudible second low frequency tone on said right channel stereo program material, said second low frequency tone being 180° out of phase relative to said first low frequency tone;
    means for recording said encoded left channel and said encoded right channel stereo program material;
    means for decoding said encoded left channel and said encoded right channel stereo program material on said stereo tape deck to recover
    said first low frequency tone and said second low frequency tone; and
    means for shunting said bias signal to ground in response to the recovery of said first low frequency tone and said second low frequency tone.

7. An apparatus as claimed in claim 6 wherein the means for encoding said first low frequency tone on said left channel stereo program material and encoding said second low frequency tone on said right channel stereo program material further comprises:
    means for inverting both the left channel and the right channel stereo program material;
    means for summing said inverted left channel and said right channel stereo program material;

means for converting said summed left channel and said right channel stereo program material to a direct current signal;

means for generating a low frequency sinusoidal signal;

means for producing an inaudible, first low frequency tone from said direct current signal at the frequency of said low frequency sinusoidal signal;

means for mixing said first low frequency tone with the left channel stereo program material to produce encoded left channel stereo program material;

means for inverting said first low frequency tone to produce a second low frequency tone that is 180° out of phase with respect to said first low frequency tone; and means for mixing said second low frequency tone with the right channel stereo program material to produce encoded right channel stereo program material.

8. An apparatus as claimed in claim 7 wherein the means for decoding said encoded left channel and said encoded right channel stereo program material on said stereo tape deck further comprises:

means for inputting said encoded left channel and said encoded right channel stereo program material to a decode circuit in said stereo tape deck;

means for summing said encoded left channel and said encoded right channel stereo program material, wherein said first low frequency tone and said second low frequency tone are differenced to produce an output signal that contains both of said low frequency tones;

means for filtering said output signal so as to reject all but said low frequency tones;

means for converting said filtered output signal to a direct current signal;

means for controlling the amplitude of said direct current signal and applying it to the base of a transistor switch; and means for shunting said bias signal of said stereo tape deck to ground whenever said transistor switch is activated.

9. An apparatus as claimed in claim 7 wherein said means for generating the low frequency sinusoidal signal outputs a signal at a frequency of 42 Hz.

10. An apparatus as claimed in claim 7 wherein said means for generating the low frequency sinusoidal signal outputs a signal at a frequency of 21 Hz.

* * * * *